United States Patent [19]

Hurley

[11] Patent Number: 4,919,568

[45] Date of Patent: Apr. 24, 1990

[54] SYSTEM FOR DRAINING LAND AREAS THROUGH SIPHONING FROM A PERMEABLE CATCH BASIN

[76] Inventor: Dennis Hurley, P.O. Box 702, Marrero, La. 70073

[21] Appl. No.: 187,022

[22] Filed: Apr. 27, 1988

[51] Int. Cl.$^5$ ............................................. C02F 9/00
[52] U.S. Cl. ................................... 405/43; 210/416.1; 210/123; 210/170; 210/258; 210/747; 405/45; 405/36
[58] Field of Search ............ 210/123, 170, 258, 416.1, 210/532.2, 747; 405/36, 43, 45

[56] References Cited

U.S. PATENT DOCUMENTS

| | | | |
|---|---|---|---|
| 341,650 | 5/1886 | Gilman | 210/170 |
| 725,793 | 4/1903 | Suddath | 405/36 |
| 2,021,853 | 11/1935 | Curley | 35/515 |
| 3,046,747 | 7/1962 | Timpe | 405/45 |
| 4,031,009 | 6/1977 | Hicks | 405/36 |
| 4,260,283 | 4/1981 | Croy | 405/36 |
| 4,720,209 | 1/1988 | Ians | 405/36 |

FOREIGN PATENT DOCUMENTS

| | | | |
|---|---|---|---|
| 537915 | 3/1922 | France | 405/36 |
| 380786 | 9/1973 | U.S.S.R. | 405/36 |
| 677729 | 8/1979 | U.S.S.R. | 405/37 |
| 1046412 | 3/1982 | U.S.S.R. | 405/45 |

Primary Examiner—Bernard Nozick
Attorney, Agent, or Firm—Pravel, Gambrell, Hewitt, Kimball & Krieger

[57] ABSTRACT

A principal catch basin defining a certain storage capacity, the catch basin situated below the level of the ground, having an upper level opening for receiving surface water drainage thereunto, and having side walls partially constructed of permeable geotextile fabric for allowing both sub-surface air to flow into the catch basin for providing additional water absorption by the ground, and for allowing water flow and sub-surface air to flow into the catch basin for providing additional water absorption by the ground, and for allowing water flow into the sub-surface water flow through the permeable basin to serve as a collection for sub-surface drainage. The system would include the ability to create a siphon within the system so that as water drains into the principle collection basin, the water may be automatically siphoned to a distant exit point or to an exit cylinder, so that there is a constant movement of water from the principle collection point to the distant exit point. In addition, there may be a plurality of collection basins which siphon into the principle collection basin which would then siphon into the distant exit point.

18 Claims, 7 Drawing Sheets

SYSTEM FOR DRAINING LAND AREAS THROUGH SIPHONING FROM A PERMEABLE CATCH BASIN

BACKGROUND OF THE INVENTION

1. Field of the Invention

The present invention relates to drainage for land areas. More particularly, the present invention relates to a system for draining land areas, such as golf courses and farms through the collection of water into a principal catch basin having permeable walls, and subsequently siphoning the water collected from the catch basin to a distant exit point such as a lake, canal, ditch or the like. There could be further included a series of secondary catch basins draining into the principal permeable catch basin, so that an even larger area may be drained through siphoning from a single control system.

2. General Background

In the present state of the art, drainage water such as water from heavy rains or the like may be collected either by a catch basin or a sub-surface drainage system that collects water through seepage. At the present time, a catch basin, which consist of a substantially box-like chamber is set within the ground and positioned at a low point where water would flow under gravity and be collected within the catch basin. At this point the water is exited through a solid pipe at a one percent slope whenever possible, so that the water then exits into some type of collection system such as a lake, pond or creek. However, often times there is insufficient fall from the point of the collection system to the exit point to either obtain a 1% grade or any positive grade at all. The only alternatives, therefore, in the past, have been to either not attempt to do the drainage at all or to attempt to build a gravel sump, dry well, or sump pump. The concept behind these systems relate to the fact that the gravel sump will provide some temporary storage capacity for the water moving out of the collection system and maintain it until it can slowly seep back into the soil profile. Often times there will be a dry well built that will extend deep enough to reach a permeable strata below the less permeable layers that are near the surface. The system has two main problems, i.e., (a) the sumps have very little capacity, and once the storage capacity is filled, the collection system will back up and stop functioning; and (b) for a system to extend deep enough into the ground to hit a sand strata, it can be a very expensive system to install, depending on the depth of the sand strata. The Environmental Protection Agency is now concerned that bringing surface water down to these strata may contaminate the water table.

The other alternative is to build a sump pump which operates a pump off of a float switch and pumps the water out every time the level of the water activates the float switch. The problem with these systems is that they require a large amount of maintenance, are expensive, and a pump has to be located at each sump.

There also is a problem with the existing type of catch basin that is presently installed. These systems operate very well when they are surrounded by an impermeable surface, such as asphalt or concrete for street or parking lot drainage. However, in land drainage such as farms and golf courses, these systems are surrounded by permeable areas of soil. The problem is that before the water can enter the catch basin system, many times a large amount of water is trapped into the permeable soil profile surrounding the catch basin itself. Once that water is trapped into the soil profile, it cannot enter through the solid walls constructed of concrete or brick, and stays in the soil profile, thus creating a wet soggy saturated area. The other problem with existing catch basins is that they are designed only to stop the largest particles from entering the pipe that is used to drain the water out of the catch basin. Therefore, many contaminants such as small rocks and branches become lodged into the piping system. To prolong the time period before clogging occurs in drainage pipes, it has been a common practice to oversize the pipe in relation to the amount of water that is necessary to be drained. This oversizing of pipe to prevent clogging increases the expense of materials for the piping, as well as the installation costs because larger amounts of dirt must be excavated to install the pipe. Also, there is no system provided in existing drainage systems for allowing the escape of air trapped within the soil profile. This air reaches an equilibrium with the infiltrating water and stops the infiltration of the water into the soil profile. If this air were allowed to escape, a larger portion of the profile could absorb the infiltrating rainwater.

There have been several patents which address the drainage of water in a system. The most pertinent are listed as follows, including a narrative of each submitted in applicants Prior Art Statement, filed herewith:

| U.S. Pat. No. | INVENTOR | TITLE |
| --- | --- | --- |
| 4,299,697 | Curati, Jr. | "A Liquid Containment And Storage System For Railroad Tracks" |
| 1,734,777 | Pike | "System Of Draining" |
| 462,864 | Hershberger | "Catch Basin For Sewers" |
| 2,432,203 | Miller | "Catch Basin" |
| 4,472,086 | Leach | "Geotextile Fabric Construction" |

SUMMARY OF THE PRESENT INVENTION

The system of the present invention solves the shortcomings of the drainage of land areas in a simple and straightforward manner. What is provided is a principal catch basin defining a certain storage capacity; the catch basin is situated below the level of the ground, having an upper level opening for receiving surface water drainage thereunto, and having sidewalls partially constructed of permeable geotextile fabric for allowing both sub-surface air to flow into the catch basin for providing additional water absorption by the ground; and for allowing the flow of sub-surface water through the permeable walled basin to serve as a collection area for what would have been trapped sub-surface water around a solid wall basin.

There is further included a system for siphoning water collected in the basin which includes a line extending from beneath the surface of the water collected in the basin to a distant exit point. This system would as a novel feature the ability to maintain a constantly primed line from the permeable catch basin to a natural body of water such as a lake or pond. The line would initially be primed in any manner which is satisfactory to create the initial siphon. The easiest way would seem to be through the use of a three way valve. This valve would be placed near the final exit point. During the priming process, the valve would close off the section of pipe from the valve to the exit, and open to the hose used for priming. After all of the siphon line was filled with water, the valve would be closed off to the hose and the hose could then be removed without losing the siphon. Lastly, the valve to the end of the pipe would then be reopened and allowed to siphon. In the preferred embodiment, this siphon would be maintained by the process of digging the catch basins to the lowest level that a natural body of water would attain. This siphon would be maintained without the use of any pumps, valves, switches or electricity. In addition, to the preferred embodiment, there would also be an alternative design that could be utilized when no body of water was present, or when the body of water that is present is not dependable in terms of the constant levels that it would maintain. In this design, not only would the siphoning be maintained by digging the depth of the catch basin to a predetermined level, but in addition, there would be included a water-filled exit cylinder at the distant exit point. This cylinder would contain a feature that would slow down the evaporation process in the cylinder, as well as prevent the cylinder from becoming a breeding area for mosquitoes. This system could be utilized in almost all areas, and it also could harness the atmospheric pressure to move the water over the hills in between the collection point and the exit point without the need for pumps, switches, floats, valves or electricity.

When neither of the two previous designs would be practical because of a unique local condition; such as a rock soil profile which would prevent the digging of the collection basin to the needed depth, a third design is available that could be used in every application. It would include a float switch located at the intake pipe in the collection system. This float switch would open when the level in the basin rose high enough to activate the float, and would stop the flow of water when the level went down low enough to lower the float. If this was the only part of this system it would not work in a siphon system, because when the float switch stopped the flow of water into the pipe, air would enter at the other end of the pipe and cause the pipe to lose its prime. However, using a shutoff at the intake in conjunction with a water filled exit cylinder would be successful because the water filled exit cylinder would keep the air from entering the pipe, thereby not allowing the water to fall out. This concept would be similar to what happens when you completely submerge a bucket of water into a swimming pool and then pull it to the surface with the bottom facing the sky. The water will stay in the bucket and be pulled above the level of the swimming pool as long as the seal around the rim of the bucket is submerged in the water and does not break union with the level of the water in the swimming pool, allowing air to enter. If the seal is not broken, the water would remain in the bucket indefinitely. Therefore, this invention would use a float operated shut-off at the intake that would stop the air from entering the intake of the pipe, and a water filled exit cylinder to stop the air from entering the pipe at the exit point.

In addition, there may be included a series of secondary collection basins, located at a point above the level of the primary collection basin, to effect a "drainage" of the secondary basin into the primary basin in order to drain a larger land area;

Therefore, it is a principal object of the present invention to provide a siphoning system to collect sub-surface and surface drainage water from land areas;

It is a further object of the present invention to provide a design of a drainage system that by its unique design harnesses the atmospheric pressure to move the water over hills in between the points of collection and the final exit point;

It is a further object of this invention that this siphoning system by its design will utilize the natural forces to regulate the system and without the use of auxiliary pumps, valves, electricity or switches, have it stop automatically before it would otherwise lose its prime when there is a natural body of water available to exit to;

It is a further object of the present invention that this siphoning system by its design continuously maintain its siphon so that the water in the exit line will always be primed and ready to siphon and can be used in absolutely every situation regardless of available bodies of water or local conditions;

It is a further object of the principal object of the present invention to provide a principal catch basin having permeable sidewalls for allowing sub-surface drainage of water into the catch basin, and subsequent siphoning of the water to a distant exit point;

It is still a further object of the present invention to provide a water collection system, so that both surface and sub-surface water may be drained from land areas to allow greater absorption of water into the land, and accommodating air flow from the soil into the basin for providing additional space for the collection of water to the soil profile;

It is still a further object of the present invention to provide a principal catch basin for siphoning water from the catch basin to a distant exit point, and a plurality of secondary catch basins for drainage of water into the principal to provide extensive drainage in land areas;

It is still a further object of the present invention to provide a system of drainage adaptable to provide increased drainage into the soil profile to provide greater drying of the surface of the land;

It is still a further object of the present invention to provide a catch basin that filters particulate matter with the use of a screen attached to the sidewalls of the catch basin. This screen will filter all but the smallest particles thus allowing for the use of much smaller pipe;

It is still a further object of the present invention to provide a catch basin that filters particulate matter with a geotextile screen surrounding the upper grate so that particulate matter never enters this system, thus allowing for the use of much smaller pipe;

It is still a further object of the present invention to provide a collection basin that can be adapted to existing solid pipe systems that presently uses gravity flow, thus increasing their collection ability of sub-surface water without changing their existing design;

It is still a further object of the present invention to create a sub-surface storage compartment through the use of permeable catch basin. Thus when the catch basin is not connected to a siphon system, it may serve as the final collection point of a drainage system, thereby replacing the use of the gravel sumps;

It is still a further object of the present invention to provide a means for draining underground spring water by using the permeable catch basin buried completely below the surface of the earth; and It is still a further object of the present invention to provide a means for siphoning spring water out of the permeable basin by using the basin upside down with the solid extensions coming all the way to the surface to allow for atmospheric pressure to enter the basin and operate the system.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
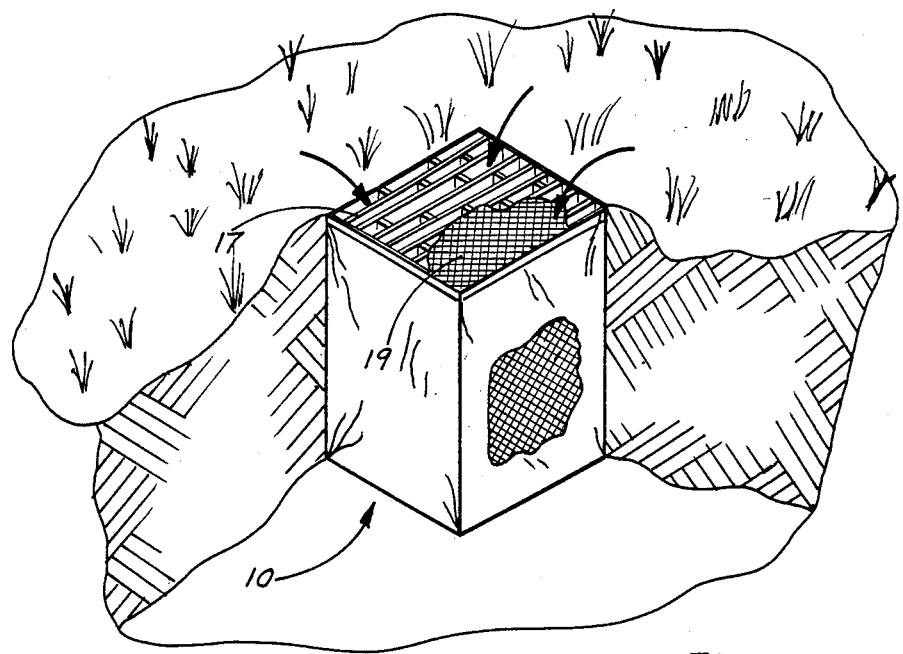
FIG. 1 represents an overall perspective view of a preferred embodiment of the permeable catch basin of the present invention.

The present invention provides a system for draining land areas through the use of a novel construction of a permeable catch basin, together with a siphoning system for automatically delivering the water collected in the basin from the basin to a distant exit point. The system is conceived under the theory that the water which is collected in the surface of the earth will slowly drain into the earth if (a) there is less water in the soil profile so that additional water can be accommodated, and (b) the air which is trapped within the soil profile is given a route to escape. Therefore, there is a need to relieve the air within the soil so that the soil may accommodate additional water absorption.

Therefore, to solve this problem of drainage of land areas, FIGS. 1 through 11 illustrate the system of the present invention. The system conceived comprises a principal catch basin, the catch basin of the typical location, i.e., a rectangular box situated beneath the surface of the earth with its opening flush with the face of the earth.

In a typical catch basin, the walls or the floor of the catch basin would be solid concrete or brick, and the upper portion would be a grill work or the like for receiving only surface runoff. However, the catch basin 10 of the present invention, as illustrated in the Figures, would include a solid floor portion 12, a plurality of rigidly constructed yet permeable wall portions 14; preferably constructed of heavy wire or molded plastic with open areas or the like, having flow spaces therethrough. The wall portions and floor portions would define a catch basin 10 receiving space 10A therewithin. An exterior layer of permeable material, such as geotextile fabric 15, mounted on and around the walls 14 and floor 10 providing a bag like structure, would provide flow spaces therethrough; so that water or air (arrows 18) under pressure within the soil profile 20 surrounding the catch basin 10 would be forced through the material into the confines of the basin 10, and would collect there in view of the fact that there is no pressure from the interior of the basin 10 to force the water into the soil 20, unless the soil profile 20 becomes drier and has therefore less pressure than the pressure of the water within the basin. The catch basin 10 would also be provided with a lid 11, having again a rigid but permeable framework, and a geotextile fabric 15 on its exterior for allowing water to flow through the material from the surface, and to allow flow of air therethrough.

The top portion 11 of catch basin 10 would consist of a standard prefabricated ABS Grate. The grate would be modified to provide a screen made out of geotextile fabric 19 placed over the grate. This bonnet would allow surface water to flow through, but would filter out the dirt soil particles and a particulate matter 21 that would plug up the system if the grate remained open, as is normally the case. This fabric does not interfere with the atmospheric pressure that would be needed to operate the siphoning system, as will be discussed further. If the grate or lid 11 was a solid top, the siphoning process would not take place. This fabric would have to be replaced from time to time because of deterioration from the ultraviolet light. Also, it will have to be periodically cleaned or replaced, since it is a filter.

Therefore, in its configuration, as rainwater or the like would collect on the surface of the soil 20 around the area of the catch basin 10, the water would place additional pressure on the air trapped within the soil 20. Catch basin 10, with its permeable wall 14, would serve as a release for the air from the soil profile 20 into the catch basin 10, and out into the atmosphere so that additional water could penetrate into soil profile 20. Following the movement of the water into the profile 20, as the soil profile 20 became saturated with water, hydrostatic pressure would force the water in the soil profile 20 to move through the sidewall 14 of the catch basin 10 (Arrows 18), and to begin to collect, together with the surface water, in the catch basin 10, so that the catch basin 10 would serve as an initial collection point for the surrounding water. Additionally, a collection pipe 19 (FIG. 4) would drain into basin 10, following collection of underground water (Arrows 23) therefore the permeable wall 25 of pipe 19.

Figure 4:
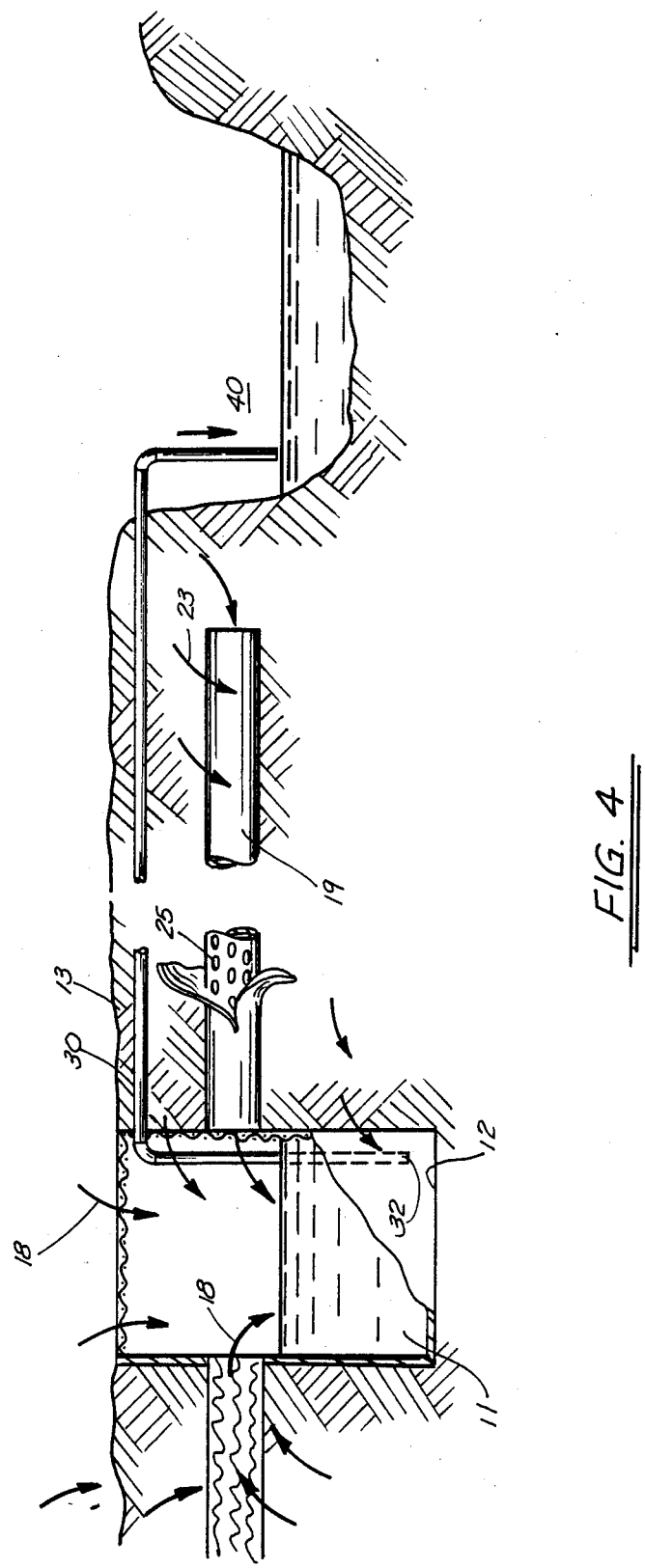
FIG. 4 represents an overall side elevational view of the system of the present invention draining into a natural body of water.

In addition, as represented in FIG. 4, the catch basin 10 would include a siphon line 30 extending from a point 32 near the bottom 12 of the collection basin and would extend, preferably underground, to a collection point 26, such as a larger drainage canal or ditch so that water within the catch basin 10 could be moved individually to distant exit point 40. The initial priming could be done by any method that was effective. The type of tubing utilized in the system would be some type of PVC tubing or plastic. It must maintain a certain rigidity that would not crush or be squeezed when buried or run over by equipment.

Therefore, it is foreseen, that once a siphon is created between the water collected in the catch basin 10 and the distant exit point 40, the flow of the water would occur naturally given the maintenance of the vacuum within the line 30 in between drainage cycles. Also, there may be points 13, that are higher than either the initial collection point, or the distant exit point, (FIG. 4), as the atmosphere pressure will force water up to heights of 33 feet above the level of the water within catch basin 10, thus eliminating the need to trench on a steady slope of 1% between basin 10 and exit point 40.

In order to maintain the siphon within the line in preferred embodiment in the Figures, it is mandatory to be able to dig the catch basin 10 to the depths of level 21, which is the lowest possible point that the natural body of water 26 could ever attain. In FIG. 4, whenever the water in basin 10 siphoned down to the level of the water in the lake 26, (level 2; this level would always be higher than level 21) the siphoning process would cease, and the prime would be maintained in line 30, because there would still be water above the intake 32 of line 30. The siphoning would take place anytime the water in basin 10 was higher than the level of the water in lake 26. For the purposes of this illustration this would be level 1. Therefore, level 1 would be different than level 2 whenever the siphoning process was going on, yet would be the same as level 2 whenever the siphoning process had stopped.

Therefore, once the siphon is created in line 30, it is maintained through the use of the depth of the catch basin being dug to a point below where the siphoning process would take place. The siphon then would always be ready to start again whenever new water entered the basin 10 and caused the level of the water in 10 to be higher than the current level of the water in the natural body of water 26. If there was a problem with the level of body of water 26 rising high enough to back siphon into 10, then line 30 could be fitted with a one way valve at the end of the line.

Figure 5:
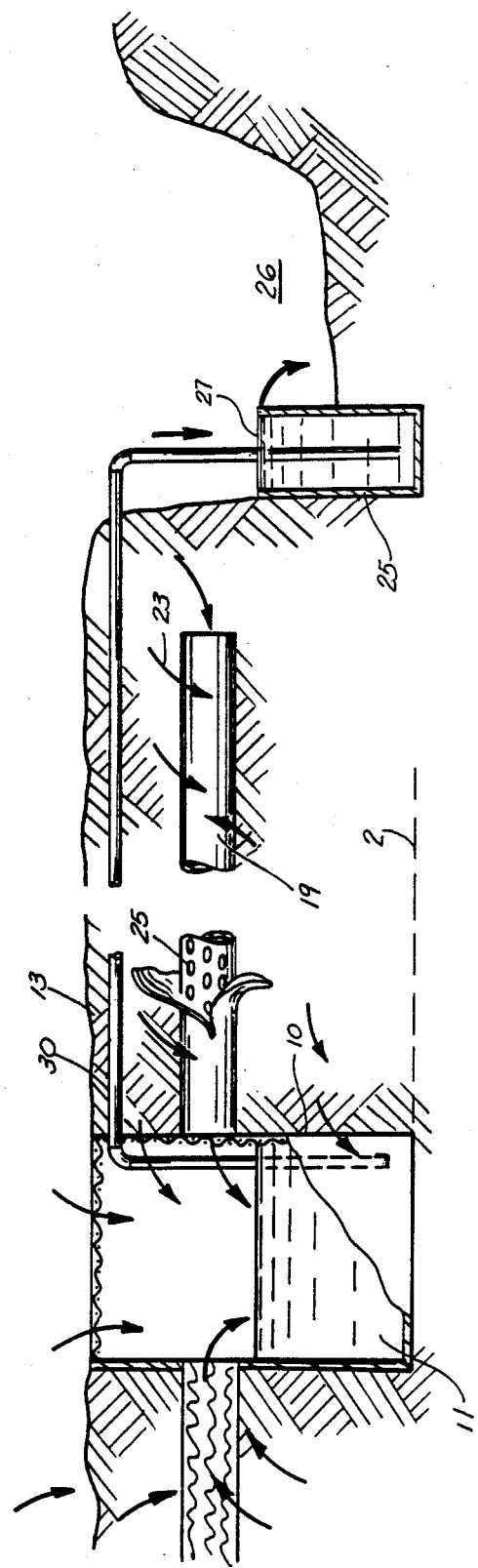
FIG. 5 illustrates an overall side view of the present invention draining into an exit cylinder in the system of the present invention.

FIG. 5 illustrates a design of the system utilizing water filled exit cylinder 25.

In order to maintain the siphon within the line 30 in the design illustrated in FIG. 5, it is necessary to be able to dig catch basin 10 to level 3, which would be the lowest point that the water-filled exit cylinder could evaporate to in normal operation. Therefore, the vacuum or siphon would be maintained with the line 30, since the level of the water within the catch basin 10 has not reached a point below tee lowest point to which the water in a receiving means, which is an exit cylinder 25, could evaporate in normal operation. Therefore, once the siphon is created, it is maintained through the use of a single water-filled exit cylinder 25, and digging the catch basin 10 to a depth below where the water-filled exit cylinder 25 could possibly evaporate to. The siphoning process will stop when the water level in basin 10 reaches the top of the water-filled exit cylinder (level 2). Line 30 is permanently placed in the cylinder 25. To slow down the evaporation process as much as possible, there would be a top 27 that would rise when water is entering the exit cylinder allowing water to seep out over the top edge of the cylinder 25. Yet when the water was not coming into the cylinder, it would rest on the top of the cylinder to stop evaporation and prevent the cylinder from being a breeding place for mosquitoes.

Figure 6:
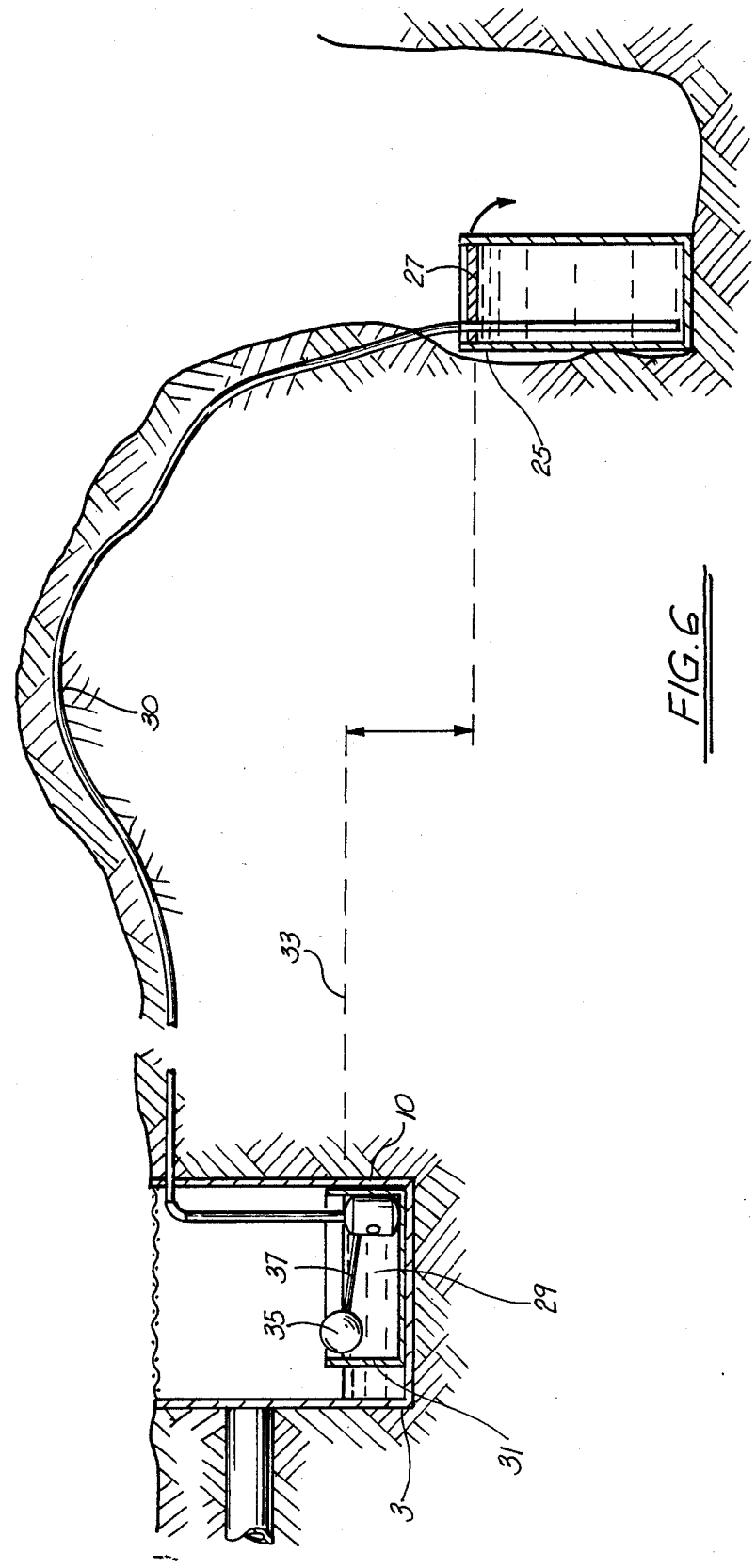
FIG. 6 represents an overall side view of the system of the present invention draining into an exit cylinder and utilizing a valve system within the permeable catch basin of the present invention.

In order to maintain the siphon in line 30 in FIG. 6, there is included a float switch 29 at the point of the intake located in the collection basin which is controlled by the rise and fall of the water level. When the water level rises to a point which activates the float switch 29, the water siphons into the intake 32 and exits through the water filled exit cylinder 25. When the water level is siphoned down to a point where the float can close the intake, the water flow is shut off, but the prime is maintained in the line because the water filled exit cylinder keeps the air from entering the exit pipe. Therefore, once the siphon is created in line 30, it is maintained through the use of a simple float switch and a water filled exit cylinder and does not require any electricity or pumps.

In summary, the present invention would utilize the natural forces to stop the siphoning process in FIG. 4 by the use of a correctly dug catch basin that would always keep water up to the point of naturally occurring siphon.

In FIG. 5 there is illustrated the preferred embodiment of the permeable catch basin 10 utilized in draining into an exit cylinder 25 within a natural body of water as illustrated in FIG. 4, in the event that the natural body of water has no water therein. As illustrated in FIG. 5, permeable catch basin 10 would have a certain quantity of water which would drain through drainage line 30 into the area of the exit cylinder 25. Exit cylinder 25 would be positioned at a depth within the earth, in this instance a cavity 26 so that the highest level of water within the exit cylinder 25 will be at the level of water as indicated in catch basin 10. Therefore, a siphon would be maintained at all times within line 30. As the level of water within catch basin would rise, a natural siphon would occur and water would flow into exit cylinder 25. Exit cylinder 25 would be adapted with a top portion 27, which would substantially float at the level of the water. In addition. Therefore, with the use of exit cylinder 25, having a quantity of water therein, the siphon between exit cylinder 25 and catch basin 10 would always be maintained, although the water level within the body of the water at area 26 would reach a low level or would be completely dry.

In FIG. 6, there is illustrated an embodiment utilizing the basin 10, the exit cylinder 25, and a single float switch 29 that opens and closes depending on the height of the water. As is illustrated in FIG. 6, the exit cylinder 25 placed at a level which is below the lower most level of the catch basin 10. Therefore, catch basin 10 includes a box structure 31 which would contain a quantity of water in which switching means 29 would be included. Therefore, when the level of the water in the catch basin 10 reached the point of line 33 as seen in the Figure, the switch would be maintained closed so that the siphon within 30 would be in tack. When in fact the level of the water in the catch basin rose due to water seeping into the basin, The switch ball 35 would then move the lever 37 to the open position thus allowing water to flow into the exit cylinder 25 through the siphoning process through lines 30. The prime is maintained during the off times by the use of the water filled exit cylinder that is placed at the end of the line and the switch in the closed position.

When the level of the water is low there, the float switch 29 is closed, and when the level of the water is high, the float switch is open. The prime is maintained during the off times by the use of a water filled exit cylinder placed at the end of the line.

Figure 3:
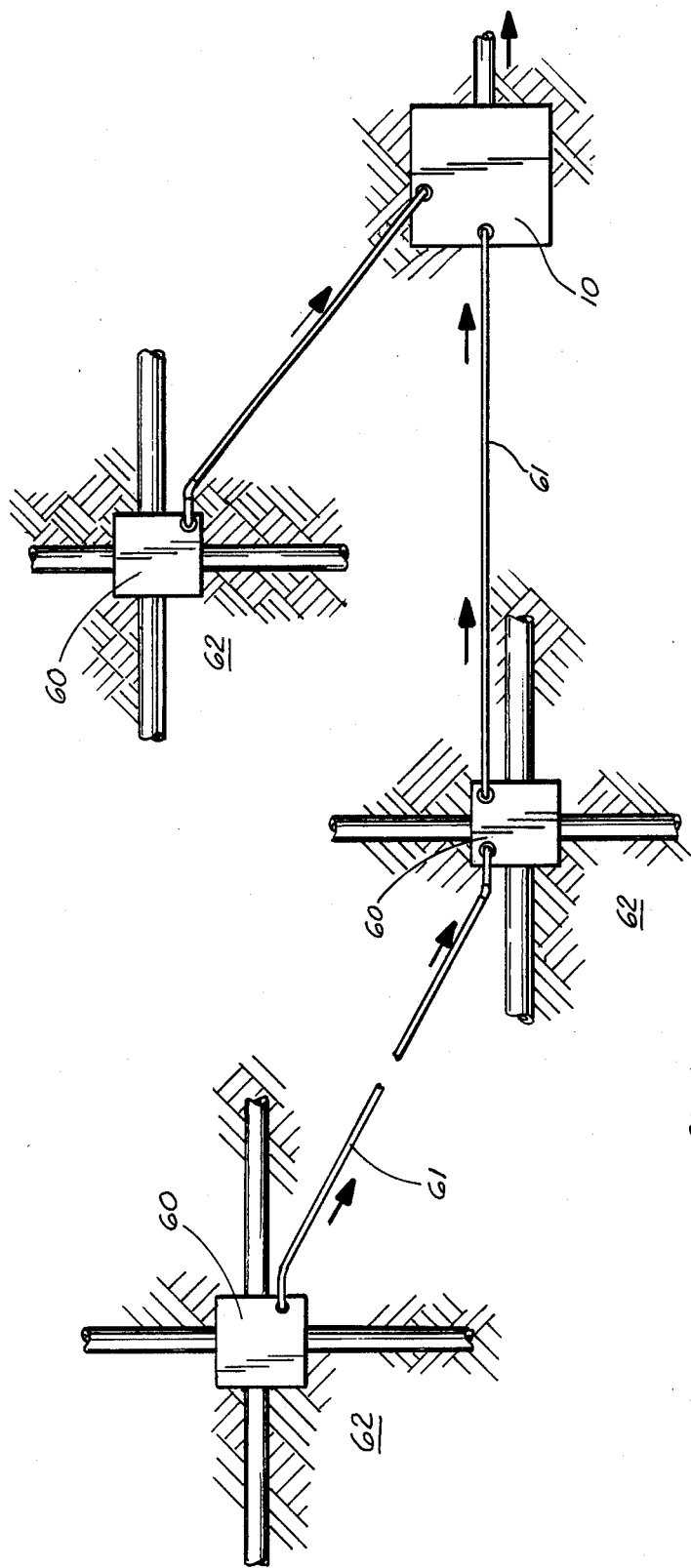
FIG. 3 represents an overall representational view of the preferred embodiment of the system of the present invention.
Figure 7A:
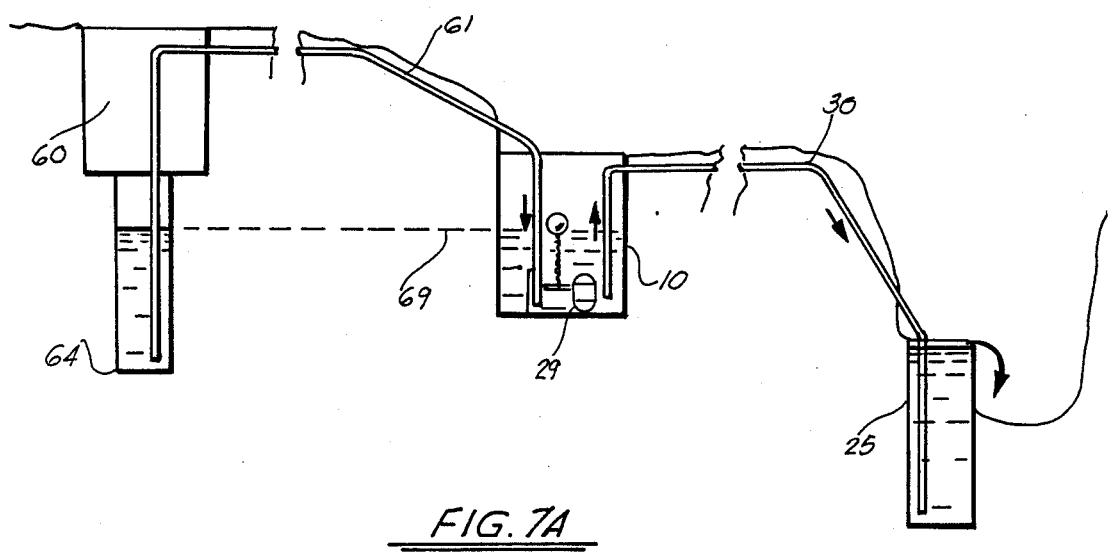
FIG. 7A illustrates a system of the present invention utilizing a modified auxiliary catch basin, the permeable catch basin in the preferred embodiment of the present invention and an exit cylinder.

As a further part of the system, the primary collection basin 10 would include a plurality of auxiliary catch basins 60, as illustrated in FIG. 3, which would be located at a point 62 above the level of the primary collection basin 10. The lines 61 from the auxiliary basin 60 to the main collection basin would then be primed in the same manner as the line from the main collection basin 10 to the distant exit point. These basins would be dug down to level 64, so that when the auxiliary basins siphoned to level 69, it would stop siphoning, since this would be the "off" level in the main control box (See FIG. 7A). For purposes of construction, the auxiliary basin 60 could likewise be constructed of a rigid framework having a permeable geotextile fabric wall for accommodating both surface air and water flow into the basin, as similar to the construction of catch basin 10.

Figure 8:
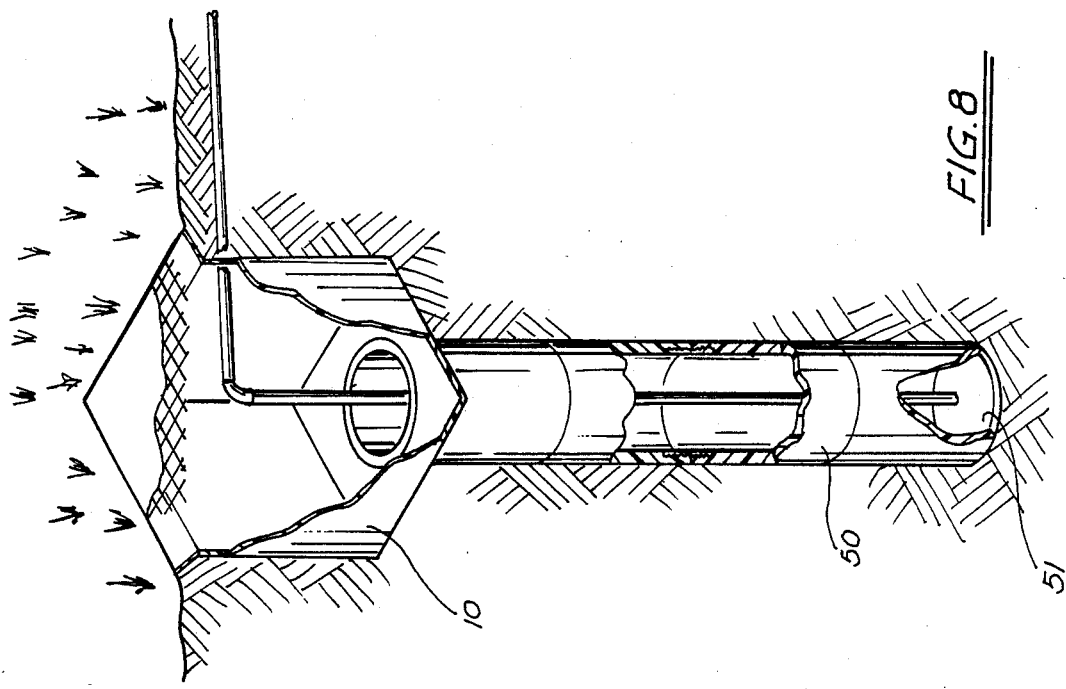
FIG. 8 represents an alternative embodiment of the permeable catch basin of the present invention.
Figure 7:
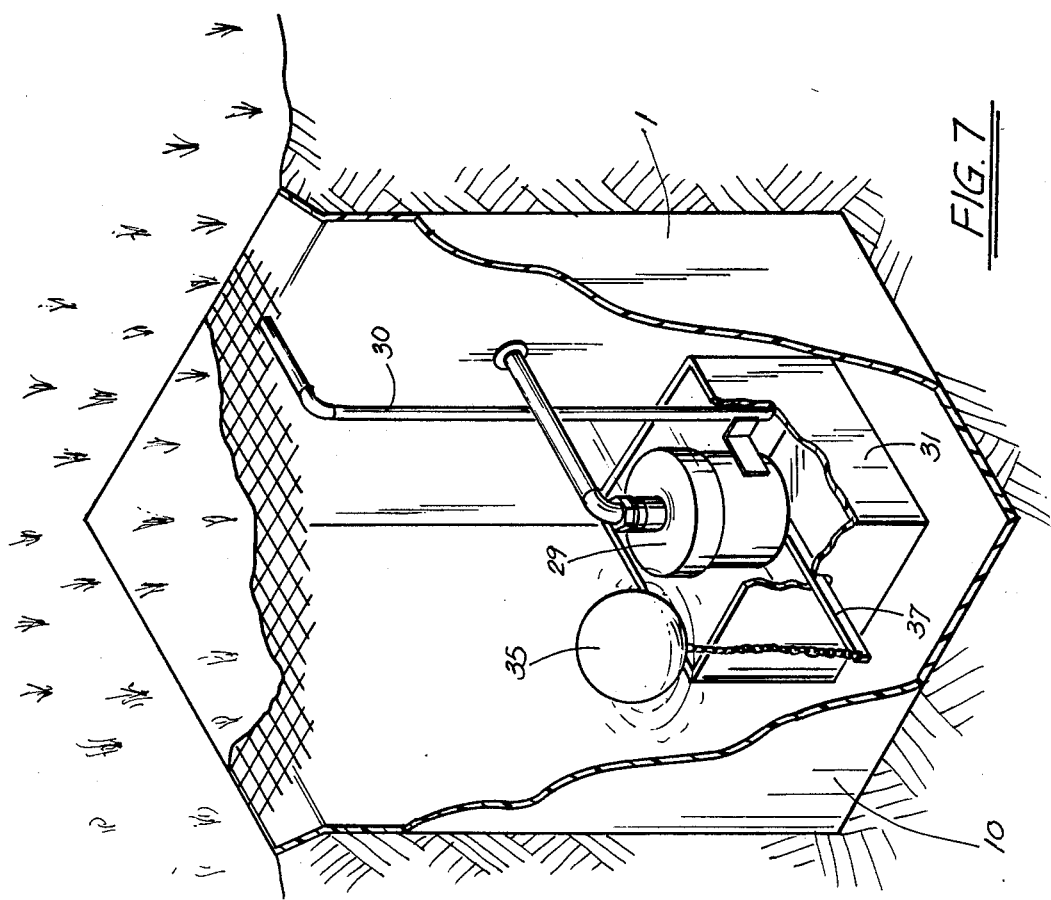
FIG. 7 illustrates an overall cutaway view of the permeable catch basin of the present invention illustrating the valving system contained within.

FIG. 8 illustrates the adaptation of the present invention of a permeable catch basin for ease of use with the siphoning system, since at times it may be necessary to dig relatively deep in order to reach the levels at which the siphoning process will automatically cease. This utilizes a solid tube 50 that could possibly be in diameters ranging from 3 to 8 inches. This solid cylinder would have threads that would screw onto the bottom of the catch basin 10. The tube would come in segments that would most conveniently be 1 foot long. The person installing the system would simply connect as many as were needed to reach the depth required for the system to function. If it was necessary to dig 15 feet to reach the level 3 of the water-filled exit cylinder, you could attach 14 feet of the solid tube to the bottom of a 1 foot deep permeable catch basin. This way the basin would have the large surface area needed to collect the water that would collect in the upper soil profile from rains, yet it would not be necessary to dig 1 foot deep hole to the total depth of the fifteen feet. The last 14 feet would be dug only large enough to accommodate a smaller diameter solid tube (i.e., 4 inches). The tube would have a solid screw-on bottom 51 at the end of it which would keep the water needed in the basin 10 from draining back into the soil profile.

Figure 11:
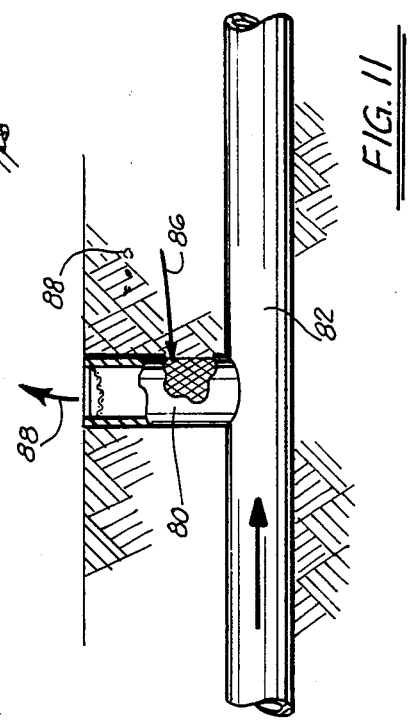
FIG. 11 represents a drainage line utilizing the permeable catch basin concept of the present invention.

FIG. 11 illustrates the adaptation of the system of the present invention for draining water through a sub-surface air and water stack. Through the use of a sub-surface air and water stack 80 adapted to a solid drainage pipe 82, an existing surface system could easily be made to collect subsurface water. In the present system, when there is solid drain pipe 82 running laterally under the soil surface carrying surface water from existing impermeable catch basins to an exit point, this design could be of use. The solid pipe in the existing system would have no way of collecting sub-surface water, since its only openings would be to impermeable catch basins that collect only surface water. By connecting a permeable vent or drainage stack 80 to drain pipe 82, the collection ability of the entire system could be enhanced without having to change the existing design that is in the ground. The system would now not only collect the surface water but would also collect the sub-surface water through the vent 80. The drainage stack 80, so extending upward from the pipe, would be accommodated with a permeable sidewall 84, such as with a permeable catch basin 10. Any water 86 draining into line 82 would allow air 88 trapped within the soil profile to escape through escape tube 80, and therefore more water could be absorbed into the soil profile.

Figure 2:
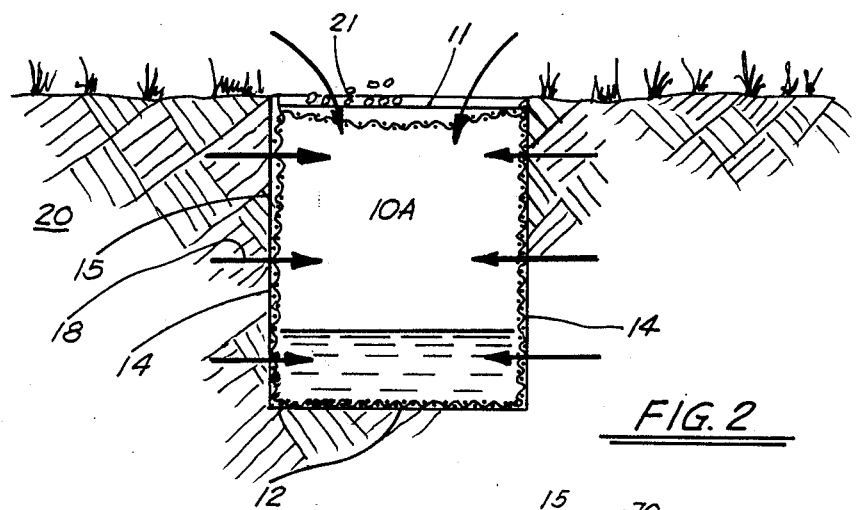
FIG. 2 represents a side elevational view of the preferred embodiment of the catch basin of the present invention.

FIG. 2 might illustrate the use of the present invention while it is used as a sump as the final collection point in a drainage system. If it is not affordable, desirable or necessary to build a system that would siphon the water out of catch basin 10, the catch basin could be adapted to be the final exit point of the water. This configuration would be used to replace a present day gravel sump. With this system, the basin would provide additional temporary storage space for the water that has been collected by pipes 19 that bring the water to the basin. The difference between this system and one that is used in a siphon system is that the floor and all parts of the system would be permeable and not solid. Wherein a siphon system we would want to maintain the levels of the water so that we do not lose our prime in the basin, with this system we would want the water to have as many exit points back into the soil as possible. The water would start to exit the basin as soon as the soil's moisture was below field capacity. At this point, the water would start to move out of the catch basin by hydrostatic pressure to the air spaces within the soil profile. Although this system would provide a limited amount of storage, it would provide approximately 10 times the amount of storage space that would be created by a standard constructed gravel sump in the same space.

Figure 10:
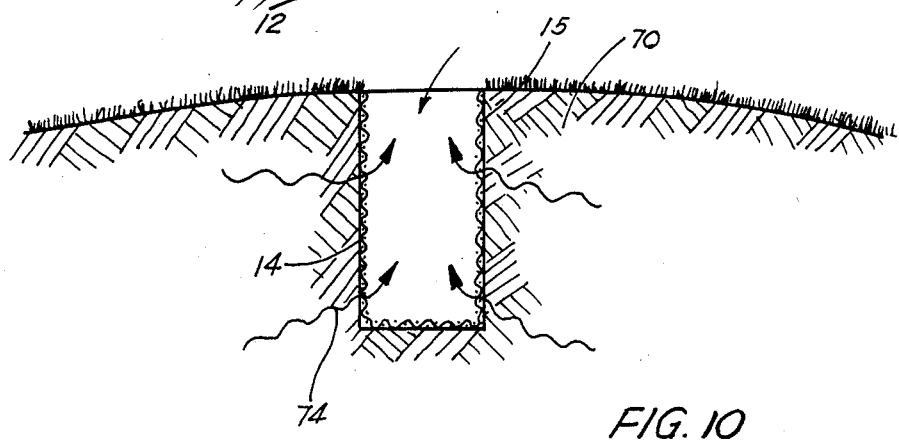
FIG. 10 illustrates a side elevational view of a putting cup utilizing the permeable catch basin concept of the present invention.

Likewise, in referring to FIG. 10 of the present invention, the concept of the permeable wall 14 for air and water vents could be utilized in the concept of drainage of golf green 70 through the use of the permeable layer 15 in "cup" 72 located on the green. Adapting the cup body with the permeable wall 15 would allow any air trapped under the green surface to be vented out of the wall 14 into the cup 72, and therefore, green 70 would accommodate a greater absorption of water into the profile of the green. Therefore, there would be a faster drying time of the green if the air (Arrows 74), were displaced by the water being absorbed into the soil.

Figure 9:
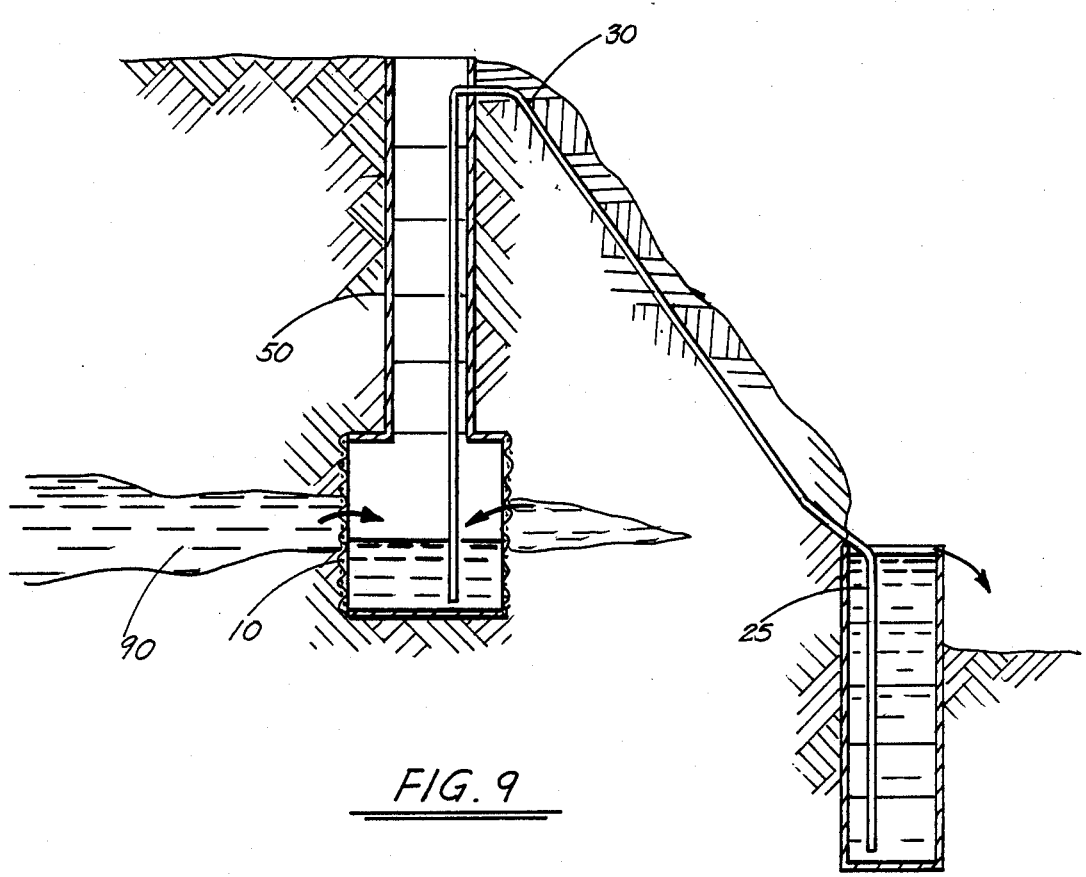
FIG. 9 illustrates a second alternate embodiment of a permeable catch basin of the present invention draining into an exit cylinder.

In FIG. 9 there is illustrated an embodiment in the system which utilizes permeable catch basin 10 as being placed at the lower end of the tube 50 with the water level in catch basin 10 being equal to the upper water level of the water contained in exit cylinder 25. Therefore, as seen in the Figure, line 30 could retrieve water which is collected in permeable catch basin 10 from an underground water source 90, and continues to siphon the water from catch basin 10 as it enters through the permeable walls, with the level of the water in the exit zones 25 allowing the siphons in line 30 to be maintained so that the water could be siphoned therefrom.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of establishing a continuous siphon in the draining of land areas, the system comprising:
    (a) providing a water collection basin having fluid permeable walls and a top portion, the basin positioned in the ground to a level of the top portion, for receiving above-ground or underground water flow into the basin, and blocking the flow of solid material into the basin;
    (b) providing means for receiving the water collected in the basin at an exit point distant from the basin;

(c) providing a fluid flow line between the water collection basin and the exit point;
(d) establishing an uninterrupted siphon of water through the flow line between the collection basin and the receiving means; and
(e) positioning the collection basin at a level in the ground so that the lowest point of water that can be collected through siphon from the basin is below the lowest most point of water in the receiving means.

2. The method in claim 1, wherein when the flow of water in the collection basin establishes a level of water within the basin higher than the water of level in the receiving means, water flow is established from the collection basin to the receiving means until such time as the level of water between the collection basin and the receiving means is of equal level.

3. The method of claim 1, wherein the flow of water between the collection basin and the receiving means must be initially manually established in the line between the basin and the receiving means to establish the siphon in the system.

4. The method in claim 1 wherein the receiving means further includes a water filled exit cylinder, housing at all times, a quantity of water in order to assure that the end of the flow line is beneath the level of the water so that a siphon is maintained between the collection basis and the water filled exit cylinder.

5. A method for establishing a continuous siphon in the draining land areas, the method comprising the following steps:
(a) providing a water collection basin, the basin comprising four side walls, a bottom portion, and a top portion, and positioned in the soil, so that the top portion is substantially the level of the ground;
(b) providing a permeable fabric comprising a portion of the four side walls of the collection basin, for allowing water from the soil profile surrounding the collection basin to flow into the collection basin, yet prevent solids from the soil profile from flowing into the collection basin;
(c) providing a fluid flow line from the collection basin to water fill exit cylinder, with the end of the fluid flow line beneath the surface of the water in the cylinder;
(d) establishing an uninterrupted siphon of water between the collection basin and the water filled exit cylinder; and
(e) providing valving means, used in conjunction with the water filled exit cylinder, for maintaining a siphon between the water collection basin and the water filled exit cylinder.

6. The method in claim 5, further including the step of positioning the collection basin at a level above the water filled exit cylinder.

7. A subsurface water collection system, comprising:
(a) one or more collection canisters, each having permeable side walls, and a top portion for allowing water to drain therethrough but preventing solids from moving into the canister through the top portion, each collection canister positioned within the soil for the canister, and preventing solids from flowing thereinto;
(b) a flow line for transporting the water collected in the collection canister to a distant exit point; and
(c) means for interconnecting the collection canisters to the flow line for allowing water to flow from the collection canisters into the flow line for transport.

8. An apparatus for draining land areas, comprising:
(a) a principal catch basin having permeable walls and a permeable top for receiving water flow, and blocking the flow of solids into the catch basin, the basin positioned within the soil so that the top portion is substantially flush with the level of the ground;
(b) a flow line extending between the catch basin and a distance exit point;
(c) at least a second auxiliary basin connected to the principal catch basin by a second flow line for establishing water flow from the auxiliary basin to the principal catch basin;
(d) means for establishing a siphon between the principal catch basin and the auxiliary catch basin, so that when the water level in the auxiliary catch basin exceeds the water level in the principal catch basin, water flow is established through a siphon to the principal catch basin; and
(e) means for simultaneously establishing a siphon between the principal catch basin and the distance exit point, so that water received into the principal catch basin from the auxiliary catch basin, in turn flows from the principal catch basin to the distance exit point under the continuous siphon, 9. The apparatus in claim 8, wherein the auxiliary catch basin further provides water and air permeable side portions for allowing sub-surface air and water flow thereinto.

10. The apparatus in claim 8, further comprising a switch member within the catch basin which includes a float switch which raises and falls with the level of water in the catch basin to activate and deactivate a valving member.

11. The apparatus in claim 8, wherein the permeable catch basin provides means to allow the initial flow of air through the walls of the catch basin to provide additional water absorption by the surrounding profile.

12. The apparatus in claim 8, wherein there is further provided additional auxiliary catch basins feeding into the principal catch basin for draining therefrom.

13. The apparatus in claim 8, wherein there is further included a pipe having a permeable wall for allowing water trapped in the soil profile to flow into the pipe and further into the principal catch basin.

14. The apparatus in claim 8, further comprising permeable side walls for allowing air and water flow through the side wall into the interior of the catch basins.

15. The apparatus in claim 8, further comprising valving means, for maintaining a siphon in the line between the catch basin and the distant exit point even if the water level in the catch basin reaches a point of the siphon line.

16. The valving means in claim 15, wherein the valve further includes a float valve, so that when the water level drops to a certain level, the level of the float causes the valve to move to the closed position for maintaining a siphon, and further when the water level in the basin reaches a certain upper level, the float in turn moves the valve to the open position, for allowing water flow from the basin, through the siphon line and into the distance exit point under a siphon.

17. An improved catch basin positionable within the soil, the catch basin comprising:
(a) a floor portion, a top portion, and four wall portions defining the interior of the catch basin, the four wall portions and the top portion further including a permeable material for receiving subsurface and above ground water flow therethrough, and blocking solid flow into the basin; and (b) a geotextile fabric, comprising a portion of each of the wall portions, and top portion so that air or water absorbed within the soil profile surrounding the catch basin may flow through the geotextile fabric in the wall portions into the interior of the catch basin, and above ground water flow through the top portion yet the soil itself is prohibited from flowing therethrough, so that the soil may be relieved of additional air or moisture, and additional water may be absorbed into the soil profile; and (c) means for draining the water from the water collected in the catch basin to a distant collection point.

18. The catch basin in claim 17, whereby there is further included a permeable collection basin that is completely submerged into the ground at the point of an underground spring, and attached to a solid pipe for carrying the water to an exit point.

* * * * *